PULSE TRAIN REPETITION RATE DIVIDER THAT DIVIDES BY $N+\frac{1}{2}$ WHERE N IS A WHOLE NUMBER Filed Sept. 18, 1962 2 Sheets-Sheet 1

| BINARY NUMBER | | | DECIMAL NUMBER |
|---|---|---|---|
| $\bar{c}$ | d | e | |
| 0 | 0 | 0 | 0 |
| 1 | 0 | 0 | 1 |
| 0 | 1 | 0 | 2 |
| 1 | 1 | 0 | 3 |
| 0 | 0 | 1 | 4 |
| 1 | 0 | 1 | 5 |
| 0 | 1 | 1 | 6 |
| 1 | 1 | 1 | 7 |

INVENTOR
C. W. PUGH
BY [signature]
ATTORNEY

INVENTOR
C. W. PUGH
BY
ATTORNEY

United States Patent Office 3,189,832

Patented June 15, 1965

3,189,832

PULSE TRAIN REPETITION RATE DIVIDER THAT DIVIDES BY N+½ WHERE N IS A WHOLE NUMBER

Charles W. Pugh, Burlington, N.C., assignor to Bell Telephone Laboratories, Incorporated, New York, N.Y., a corporation of New York Filed Sept. 18, 1962, Ser. No. 224,567
4 Claims. (Cl. 328—42)

This invention relates to pulse train repetition rate dividers and in particular to such dividers which divide by numbers other than whole numbers.

The use of pulse train repetition rate dividers in digital types of apparatus is well known. They are frequently used, for example, to produce timing pulse trains having repetition rates which are submultiples of the repetition rates of basic timing or "clock" pulse trains. It appears, however, that such dividers found in the prior art are limited to dividing by whole numbers. In other words, pulse trains produced by prior art dividers have repetition rates which are equal to the repetition rates of input pulse trains divided by whole numbers. Although these dividers are useful in many applications, they cannot, of course, divide by a number other than a whole number.

An object of the invention is to produce a pulse train having a repetition rate which is equal to the repetition rate of another pulse train divided by $N+½$, where N is a whole number.

In accordance with the invention in one of its broader aspects, a pulse train is applied to a counter. One-half of a pulse cycle after a predetermined count is registered in the counter an output signal is produced. When the output signal is produced, the counter is reset to a second count which is less than the predetermined count by an amount equal to $2N+1$, where N is a whole decimal number. When the counter registers a third count equal to the second count plus $N+1$, another output signal is produced and the cycle repeats itself. These output signals appear at a repetition rate which is equal to the repetition rate of the pulse train divided by $N+½$.

The invention is disclosed and claimed as comprising incremental counters. It should be recognized, however, that it is a matter of convention as to whether a particular counter is considered to be of the incremental type or of the decremental type. In other words, it is a matter of convention as to whether successive outputs from a particular counter correspond to an increasing set of numbers or a decreasing set of numbers. In view of this fact, the counters referred to in the present disclosure and claims also include those that may nominally be referred to as of the decremental type.

One embodiment of the invention includes a counter having both a presetting circuit which, when energized, causes the counter to register a preset value and an input circuit for receiving an input pulse train. An AND gate is connected to both the output and the input circuits of the counter to produce a first output signal at substantially one-half of a pulse period of the input pulse train after the counter registers a predetermined count. This output signal is applied both to the counter for setting the counter to register a second count which is $2N+1$ less than the predetermined count and to an OR gate. A second AND gate is connected to both the input and the output circuits of the counter to produce a second output signal when the counter registers a third count which equals the second count plus $N+1$. The output signal from the second AND gate is also applied to the OR gate. The output signals from the OR gate are made available at an output terminal as the output pulse train of the divider.

Other objects and features of the invention will be apparent from a study of the following detailed description of an illustrative embodiment.

Figures 1, 3:
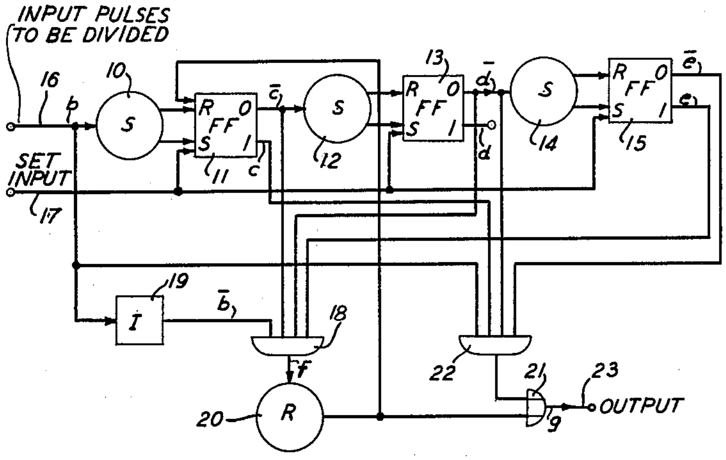
FIG. 1 shows a block diagram of one embodiment illustrating the principles underlying the invention.
FIG. 3 illustrates a conventional conversion between binary and decimal numbers.

The embodiment of FIG. 1 includes a conventional three-stage counter. The first stage comprises a steering circuit 10 and a flip-flop circuit 11, the second stage comprises a steering circuit 12 and a flip-flop circuit 13 while the third stage comprises a steering circuit 14 and a flip-flop circuit 15. These circuits are conventional in both design and operation so that a positive-going pulse applied to any of the steering circuits causes its flip-flop circuit to change state. To facilitate the following discussion, the convention of identifying the halves of the flip-flop circuits by zeros and ones has been adopted. The stages are interconnected so that the output identified as $\bar{c}$ of the zero half of flip-flop circuit 11 is applied to steering circuit 12 while the output identified as $\bar{d}$ of the zero half of flip-flop circuit 13 is applied to steering circuit 14. An input lead 16 applies an input identified as $b$ to steering circuit 10. Finally, a set lead 17 is provided for applying a signal to the one sides of the flip-flop circuits to cause the outputs identified as $c$, $d$ and $e$ from these sides to be at their less positive values and the outputs identified at $\bar{c}$, $\bar{d}$ and $\bar{e}$ to be at their more positive values.

The embodiment of FIG. 1 also includes a circuit arrangement comprising an AND gate 18, an inverter circuit 19 and a pulse regenerator 20. The input circuit of inverter circuit 19 is connected to input lead 16 while its output circuit, on which appears an output identified as $\bar{b}$, is connected to one of the input circuits of AND gate 18. Second and third input circuits of AND gate 18 are connected to the output circuits of the zero sizes of flip-flop circuits 11 and 13, respectively, while a fourth input circuit of AND gate 18 is connected to the output circuit of the one side of flip-flop circuit 15. The output circuit of AND gate 18, on which appears an output identified as $f$, is connected to the input circuit of pulse regenerator 20. The output circuit of regenerator 20 is connected to input circuits of the zero side of flip-flop circuits 11 and an OR gate 21. A pulse applied to flip-flop circuit 11 by regenerator 20 causes output $\bar{c}$ to switch to its less positive value while output $c$ is switched to its more positive value.

The embodiment of FIG. 1 also includes an AND gate 22. The input circuits of AND gate 22 are connected to input lead 16, the output circuit of the one side of flip-flop circuit 11 and the output circuits of the zero sides of flip-flop circuits 13 and 15, respectively. The output circuit of AND gate 22 is connected to a second input circuit of OR gate 21. The output from the embodiment appears on an output lead 23 connected to the output circuit of OR gate 21.

AND gates 18 and 22 produce more positive outputs when all of their inputs are at their more positive levels.

Figure 2:
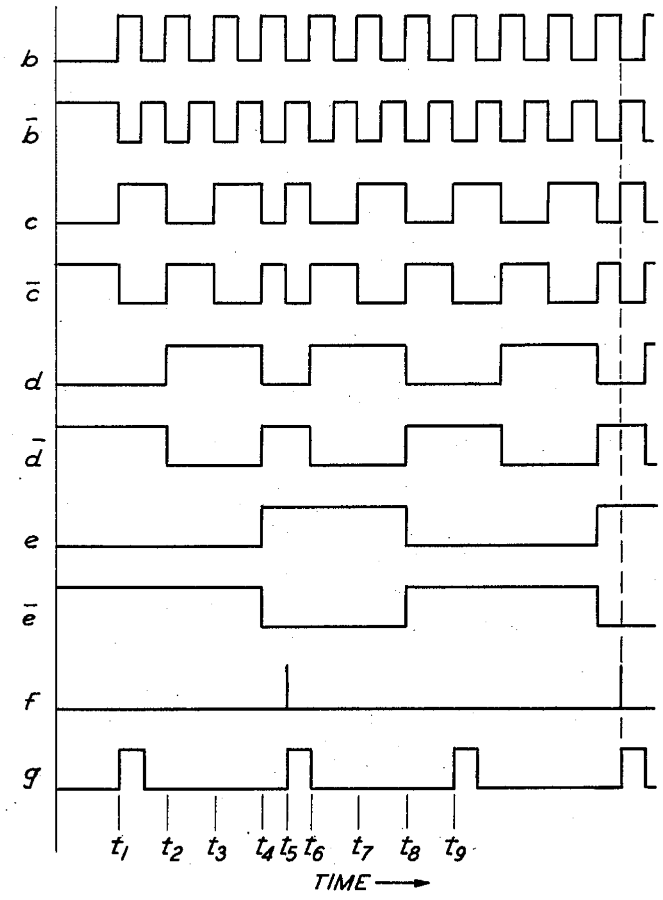
FIG. 2 illustrates waveforms of pulses appearing at various points within the embodiment of FIG. 1 when this embodiment is in operation.

The operation of the embodiment of FIG. 1 is now presented in conjunction with the various waveforms shown in FIG. 2. These waveforms, which all have the same time base, represent the various outputs previously defined.

Prior to time $t_1$, input $b$ is at a constant level and the counter is at a preset value as a result of energizing set lead 17. Outputs $c$, $d$ and $e$ are therefore at their less positive levels while outputs $\bar{c}$, $\bar{d}$ and $\bar{e}$ are at their more positive levels. At time $t_1$, the first pulse of an input pulse train is applied to input lead 16 as input $b$. The first positive-going excursion of input $b$ causes flip-flop circuit 11 to change state so that output $c$ switches to its more positive value and output $\bar{c}$ switches to its less positive value. Steering circuit 12 does not respond to the change in output $\bar{c}$ because, as previously discussed, the steering circuits only respond to positive-going signals. Flip-flop circuits 13 and 15 do not, therefore, change state. As soon as flip-flop circuit 11 changes state, all of the inputs ($b$, $c$, $\bar{d}$ and $\bar{e}$) applied to AND gate 22 are at their more positive levels and AND gate 22 produces a positive-going output which is applied via OR gate 21 to output lead 23 as output $g$. When input $b$ undergoes a negative-going change one-half of a pulse period later, output $g$ undergoes a negative-going excursion which results in producing an output pulse. Nothing else undergoes a change at this time other than output $\bar{b}$.

At time $t_2$, input $b$ undergoes a positive excursion which causes flip-flop circuit 11 to change state. When flip-flop circuit 11 changes state, output $c$ switches to its less positive value while output $\bar{c}$ switches to its more positive value. Steering circuit 12 responds to the positive-going change in output $\bar{c}$ and causes flip-flop circuit 13 to change state. When flip-flop circuit 13 changes state, output $d$ switches to its more positive value while output $\bar{d}$ switches to its less positive value. Because steering circuit 14 does not respond to the negative-going change in output $\bar{d}$ flip-flop circuit 15 does not change state. The inputs applied to AND gates 18 and 22 are not at this time of such a nature to cause either of their outputs to change. Input $b$ and inverter output $\bar{b}$ again undergo a change one-half of a pulse period later; nothing else occurs, however, until time $t_3$.

The positive-going excursion of input $b$ at time $t_3$ again causes flip-flop circuit 11 to change state. When flip-flop circuit 11 changes state, output $c$ switches to its more positive value while output $\bar{c}$ switches to its less positive value. Because steering circuit 12 does not respond to a negative-going change in output $\bar{c}$, neither of flip-flop circuits 13 and 15 changes state. Other than input $b$ and inverter output $\bar{b}$ again undergoing a change one-half of a pulse period later, nothing else occurs until time $t_4$.

At time $t_4$, input $b$ once again undergoes a positive excursion which again causes flip-flop circuit 11 to change state. This latest change in flip-flop circuit 11 causes its output $c$ to switch to its less positive value while its output $\bar{c}$ switches to its more positive value. Steering circuit 12 responds to the positive-going change in output $\bar{c}$ and flip-flop circuit 13 changes state. When flip-flop circuit 13 changes state, its output $d$ switches to its less positive value while its output $\bar{d}$ switches to its more positive value. Steering circuit 14 responds to the positive-going change in output $\bar{d}$ and causes flip-flop circuit 15 to change state. When flip-flop circuit 15 changes state, its output $e$ switches to its more positive value while its output $\bar{e}$ switches to its less positive value.

At this time, outputs $\bar{c}$, $\bar{d}$ and $e$ applied to AND gate 18 are at their more positive levels while inverter output $\bar{b}$ applied to AND gate 18 is at its less positive level. At time $t_5$, which is one-half of a pulse period after time $t_4$, inverter output $\bar{b}$ changes to its more positive value and AND gate 18 produces an output which triggers pulse regenerator 20. The output from regenerator 20 is unaffected by output $f$ once regenerator 20 has been triggered. Regenerator 20 produces a pulse output which has a duration substantially equal to the duration of the pulses in input $b$.

The output from regenerator 20 is applied to flip-flop circuit 11 and causes this circuit to change state so that output $c$ switches to its more positive value while output $\bar{c}$ experiences a negative-going excursion at this time, steering circuit 12 does not respond to output $\bar{c}$ and flip-flop circuits 13 and 15 remain in the states which they were in at time $t_5$. When output $\bar{c}$ switches to its less positive value, output $f$ of AND gate 18 reverts to its less positive level. Output $f$, as shown in FIG. 2, is a relatively short pulse or spike.

The output from regenerator 20 is also applied to OR gate 21, which causes a second pulse to appear in output $g$ as shown in FIG. 2. It should be noted that the leading edge of this pulse occurs at three and one-half pulse periods of input $b$ after the leading edge of the preceding pulse in output $g$.

At time $t_5$, input $b$ undergoes another change which causes flip-flop circuit 11 to change state. Output $\bar{c}$ from flip-flop circuit 11 causes flip-flop circuit 13 to change state. Flip-flop circuit 15, however, does not change state.

Flip-flop circuit 15 again changes state at time $t_7$ while flip-flop circuits 13 and 15 do not change state.

At time $t_8$, flip-flop circuits 11, 13 and 15 each change state. The flip-flop circuits are now all in the same states in which they were prior to time $t_1$. At time $t_9$, the cycle that took place between times $t_1$ and $t_9$ begins again.

A comparison of output $g$ with input $b$ will immediately indicate that the repetition rate of output $g$ is equal to the repetition rate of input $b$ divided by three and one-half.

The operation of the embodiment of FIG. 1 may be further appreciated by considering outputs $c$, $d$ and $e$ as representing binary bits of binary numbers. In particular, let the less positive values of these outputs represent binary zeros and their more positive values represent binary ones. The table in FIG. 3 shows a conventional conversion between the binary numbers represented by outputs $c$, $d$ and $e$ and decimal numbers. It will be noted that, in accordance with this convention, the counter registers the binary equivalent of the decimal four at time $t_4$. One-half of a pulse period after the binary equivalent of the decimal four has been registered, an output is produced and the counter is reset to the binary equivalent of the decimal minus three. Minus three, it should be noted, is $2N+1$, or seven, less than the four. (Because the counter resets to the binary equivalent of the decimal zero in the next count after the binary equivalent of the decimal seven, the binary equivalent of the decimal minus three is also the binary equivalent of the decimal five.) At time $t_9$ (which is three and one-half pulse periods after time $t_5$), the counter registers the binary equivalent of the decimal one and another output pulse is produced. One, it should be noted, is $N+1$, or four, greater than minus three. The cycle then repeats itself with output pulses appearing in output $g$ at a repetition rate equal to the repetition rate of input $b$ divided by $N+½$, which is three and one-half.

Although the invention has been disclosed with respect to one embodiment, various other embodiments may be devised by those skilled in the art without departing from the spirit and scope of the invention.

What is claimed is:

1. A pulse train repetition rate divider that divides by $N+½$, where N is a whole number, comprising a pulse counter, an input circuit connected to said pulse counter for applying input pulses thereto, first means connected to the output of said input circuit and the output of said counter to produce a first output signal only upon the termination of one-half of a pulse period of said input pulses after said counter registers a first count equal to N greater than the initial count in said counter, second means to apply said first output signal to said counter to reset said counter to a second count which is less than said first count by an amount equal to $2N+1$, third means responsive to said counter to produce a second output signal when said counter registers a third count which is greater than said second count by an amount equal to $N+1$, and fourth means making available said first and second output signals as the output of said combination.

2. A combination comprising the combination of claim 1 and a presetting circuit for setting said counter to a count one less than said third count.

3. A combination in accordance with claim 1 in which said first means comprises a first AND gate having its input leads connected to said counter and said input circuit and a pulse regenerator having its input circuit connected to the output circuit of said AND gate, said third means comprises a second AND gate having its input leads connected to said counter and said input circuit, and said fourth means comprises an OR gate having its input circuits connected to the output circuits of said pulse regenerator and said second AND gate, respectively.

4. A combination comprising the combination of claim 3 and a presetting circuit for setting said counter to a count one less than said third count.

References Cited by the Examiner

UNITED STATES PATENTS 3,012,096 12/61 Steinmetz et al. ------- 307—88.5

ARTHUR GAUSS, *Primary Examiner.*